Figure 1:
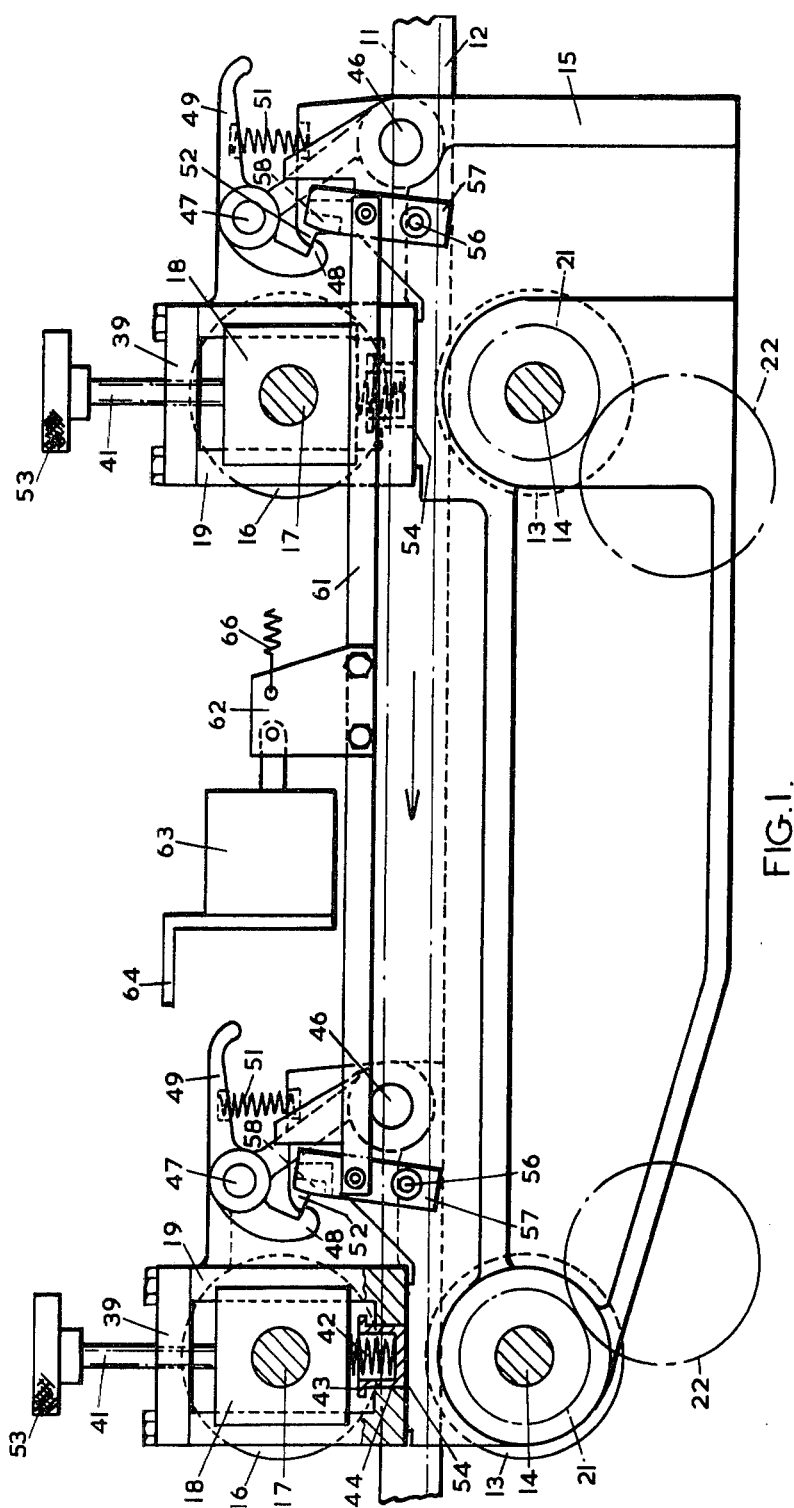

United States Patent [19]

Naylor et al.

[11] 4,300,329
[45] Nov. 17, 1981

[54] FEEDING OF A CONTINUOUS ROPE OF CANDY OR LIKE CONFECTIONERY MATERIAL

[75] Inventors: Arthur V. Naylor, Seacroft; John K. Spencer, Gainsborough, both of England

[73] Assignee: Baker Perkins Holdings Limited, Cambridge, England

[21] Appl. No.: 100,012

[22] Filed: Dec. 4, 1979

Related U.S. Application Data

[63] Continuation of Ser. No. 877,290, Feb. 13, 1978, abandoned.

[30] Foreign Application Priority Data

Feb. 13, 1977 [GB] United Kingdom ................. 6822/77

[51] Int. Cl.³ ............................................ B65B 57/02
[52] U.S. Cl. ........................................ 53/506; 53/234
[58] Field of Search .................... 53/53, 73, 505, 506, 53/516, 225, 266 A, 234; 26/35

[56] References Cited

U.S. PATENT DOCUMENTS

| | | | |
|---|---|---|---|
| 1,659,143 | 2/1928 | Hopkins | 53/53 |
| 1,664,048 | 3/1928 | Schmitt | 53/73 |
| 1,892,275 | 12/1932 | Jensen | 53/73 |
| 2,510,234 | 6/1950 | Knott | 226/35 X |
| 2,672,717 | 3/1954 | Russell | 53/73 |
| 2,931,487 | 4/1960 | Frank | 53/73 |
| 3,451,188 | 6/1969 | Weinzuhl | 53/73 |
| 3,724,945 | 4/1973 | Masiello | 226/35 |
| 3,877,627 | 4/1975 | Boase | 226/35 X |

*Primary Examiner*—John Sipos
*Attorney, Agent, or Firm*—Fitzpatrick, Cella, Harper & Scinto

[57] ABSTRACT

In the manufacture of sweets from a continuous rope of toffee or like confectionery material and the wrapping thereof in suitable wrapping material, it is customary to ensure that the feed of the rope is interfered with in the event of any interference with the supply of wrapping material. The present invention provides such interference by substantially instantaneously removing driving contact between the rope and the rope-driving surface, thus substantially preventing unwrapped sweets from coming into contact with the wrapping elements.

5 Claims, 7 Drawing Figures

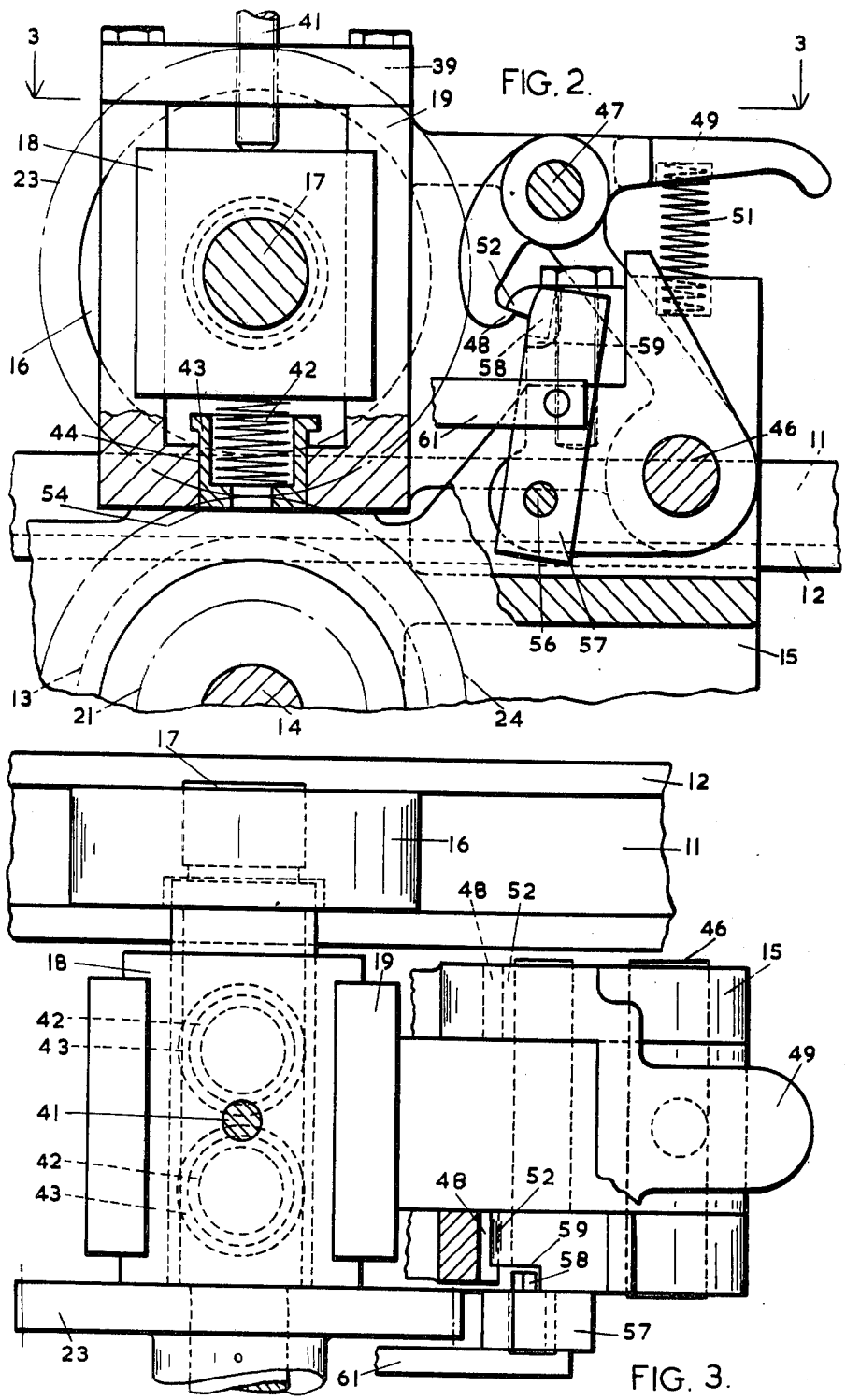

FEEDING OF A CONTINUOUS ROPE OF CANDY OR LIKE CONFECTIONERY MATERIAL

This is a continuation of application Ser. No. 877,290, filed Feb. 13, 1978, now abandoned.

This invention relates to the feeding of a continuous rope of candy or like confectionery material (hereinafter referred to as a "rope") along a forming channel constituting part of a sweet-forming and wrapping machine of the type (hereinafter referred to as the "type described") in which the rope is severed at intervals to form a succession of individual sweets as the leading end of the rope repeatedly emerges from the end of the forming channel into a transfer channel from which the formed sweets are transferred in succession into successive pockets of a pocketed wrapping member, e.g. a 'mould wheel', a wrapper of paper, foil, film or like wrapping material being fed across the path of movement of each transferred sweet to be carried with, and partially folded around, the sweet into the adjacent pocket of the wrapping member, the wrapping operation being completed during subsequent movement of the wrapping member. In this type of apparatus it is usual to sever the individual wrappers in succession from a continuous web of the wrapping material in known manner and there is provided a control device for detecting the interruption of the supply of wrapping material, e.g., upon breakage or exhaustion of the web, and upon such detection, to bring about cessation of the operation of the machine, e.g., by actuation of a microswitch controlling the operation of an essential part of the driving mechanism.

When such stoppage occurs, particularly when using up-to-date high speed machinery, e.g., producing 1000 sweets per minute or more, the overrun of the machine, necessarily occurring between the actuation of the controlling switch and the actual stoppage of the machine, completes the wrapping of partially wrapped sweets and often causes unwrapped sweets to pass into the pockets of the folding member and into contact with subsequent folding elements of the machine, and since the rope at this stage is still in a "tacky", or even sticky condition, cleaning operations need to be performed on the folding mechanism in general before production can be re-started.

An object of the present invention is to alleviate, if not entirely obviate the above difficulty.

According to the present invention, a continuous rope of candy is fed along a forming channel constituting part of a sweet-forming and wrapping machine of the type described and, upon detection of the interruption of the supply of wrapping material, the feeding of the rope is so manipulated that unwrapped sweets are substantially prevented from coming into contact with the wrapping elements.

Such prevention may be accomplished in a variety of ways. Thus, for example, upon operation of the control device, the rope may be substantially instantaneously diverted out of its normal path of travel towards the transfer channel, e.g., by pivotal movement of the forming channel, upon operation of the control device mentioned above. Similarly, a clutch and brake unit may be incorporated in the rope-driving mechanism and arranged to be actuated by the control device, as before, to stop the feeding of the rope substantially instantaneously.

In one embodiment of the invention, the rope is forwarded along the forming channel by one or more pairs of upper and lower feed rollers connected by intermeshing gearing and means are provided for substantially instantaneously shifting one roller of the or each pair of feed rollers from an operative position in driving contact with the rope to an inoperative position out of contact with the rope upon operation of the control device whereby slippage substantially immediately occurs between the rope and the remaining driving surface or surfaces with the result that feeding movement of the rope substantially ceases.

Figure 4:
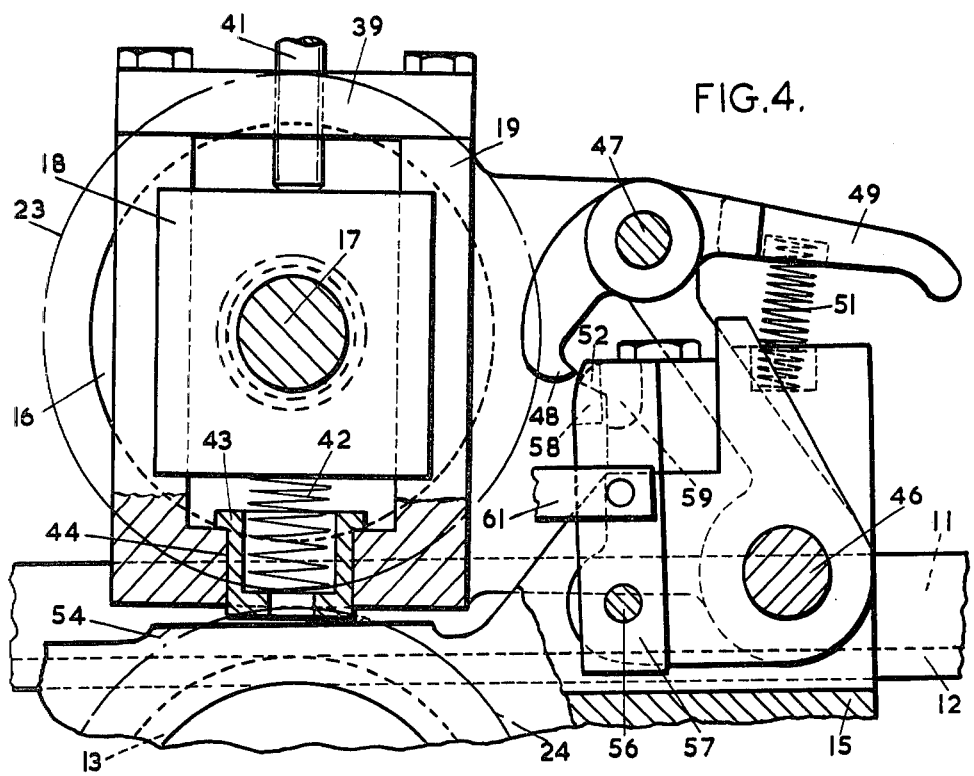
Figure 5:
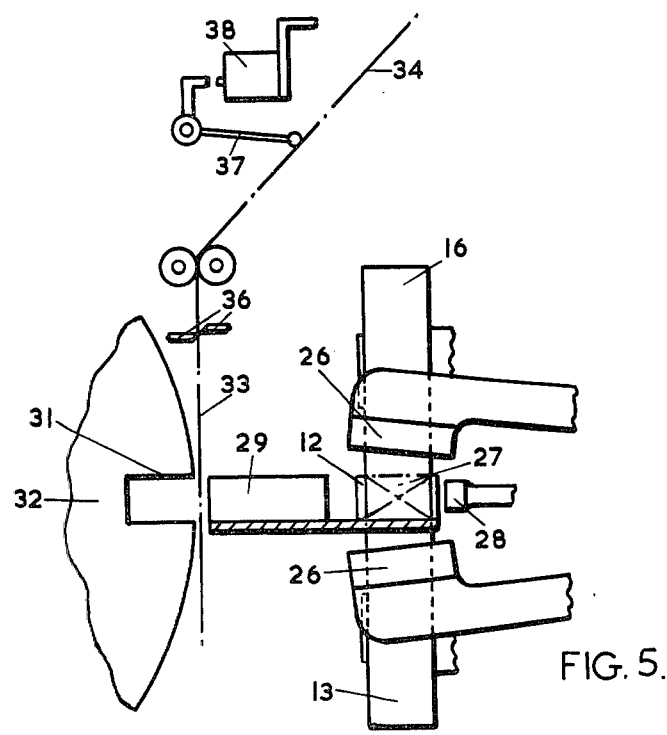
Figure 6A:
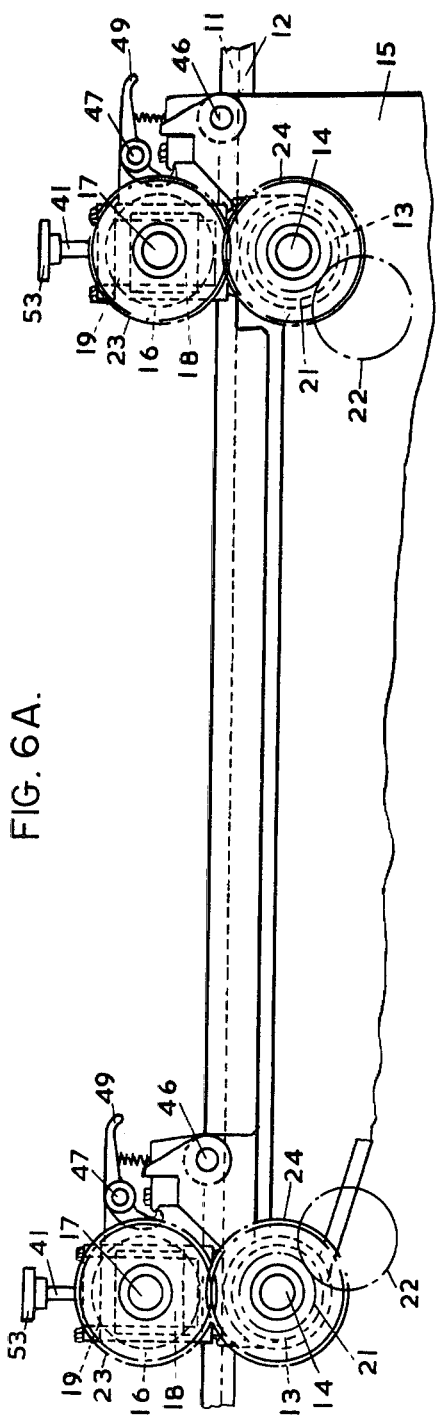

By way of example, the invention will now be described in greater detail with reference to the accompanying diagrammatic drawings, in which FIG. 1 is a part-sectional elevation of a rope-forming and feeding apparatus constituting part of a sweet-forming and wrapping machine of the type described and illustrating one embodiment of the invention, FIG. 2 is a similar elevation of part of the apparatus shown in FIG. 1, drawn to a larger scale, FIG. 3 is a plan of the apparatus shown in FIG. 2, taken on the line 3—3 in FIG. 2, FIG. 4 is a view similar to FIG. 2 showing the inoperative position of the apparatus, FIG. 5 is a view of the wrapping portion of the combined machine, and FIGS. 6A and B together are a fragmentary elevations similar to FIG. 1, illustrating another embodiment of the invention.

Figure 6B:
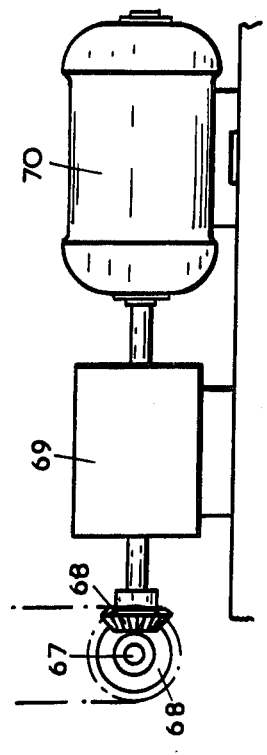

As illustrated generally in FIGS. 1, 5 and 6, a rope 11 supplied from a known type of batch rolling machine (not shown) is fed towards the cutting mechanism (not shown) of the sweet-forming and wrapping machine referred to, the rope 11 being fed along a forming channel 12 by a pair of lower feed rollers 13 each secured to a spindle 14 rotatably mounted in a framework 15, and a pair of upper feed rollers 16 each secured to a spindle 17 rotatably mounted in a bearing block 18 itself slidably mounted on a bracket 19. In the embodiment illustrated in FIG. 1, each lower roller 13 is intermittently driven by a gear 21 secured to the spindle 14 and arranged in mesh with further gears 22, driven from a common driving mechanism, e.g. a Geneva mechanism (not shown) operating in timed relationship with the rope-cutting, sweet-transfer and wrapping apparatus illustrated in FIG. 5. Each upper roller 16 is driven by a gear 23 (FIG. 2) secured to the spindle 17 and arranged in mesh with a gear 24 secured to the shaft 14.

The pairs of feed rollers 13, 16 serve to forward the formed rope along the forming channel 12 to a cutting mechanism consisting of a pair of knives 26 which sever the rope 11 at intervals to form individual sweets 27 which are then transferred in succession to the wrapping machine in known manner by a transfer pusher 28 (see FIG. 5) serving to transfer each sweet 27 transversely from the channel 12 through a pair of side guides 29 into a waiting pocket 31 of a wrapping wheel 32, a wrapper 33, severed from a web 34 of wrapping material by a pair of knives 36, being fed across the path of movement of the sweet 27 to be carried with, and partially folded around, the sweet into the waiting pocket 31, the wrapping operation being completed during subsequent movement of the wrapping wheel 32 in known manner.

For detecting the interruption of the supply of wrapping material, a pivoted detector arm 37 is arranged freely to rest on the web 34 so as to pivot in the event of breakage or exhaustion of the web 34, and in so doing, cause actuation of a control switch 38 controlling the operation of an essential part of the driving mechanism of the apparatus as described below.

Referring again to FIG. 1, and to FIGS. 2, 3 and 4, each bracket 19 is provided with a top plate 39 in which is mounted an adjusting screw 41 arranged in engagement with the upper surface of the block 18, the screw 41 providing nicety of adjustment to the pressure of the roller 16 on the rope 11 against the action of a pair of springs 42 housed in a pair of flanged housings 43 slidably mounted in bores 44 formed in the base of the bracket 19.

Each bracket 19 is pivotally mounted on a spindle 46 secured in the framework 15 to allow the bracket 19 together with the upper roller assembly to be pivoted upwardly clear of the channel 12 to give access to the latter when required, e.g. for cleaning purposes. Also pivotally mounted on a spindle 47 in each bracket 19 is a pair of latch members 48 having a handle 49 extending therefrom to allow the latches 48 to be moved, against the action of a spring 51, into and out of engagement with a pair of catches 52 secured to the framework 15, engagement of the latches 48 with the catches 52 serving to lock the upper roller assembly in operative position to feed the rope 11 (FIGS. 1 and 2).

When each upper roller 16 is moved to the inoperative position by disengagement of the latches 48, the springs 42 force the housings 43 downwardly along the bores 44 in the bracket 19 by an amount allowed by flange on the housings and, when each upper roller assembly is moved into operative position, by manual pressure on a knob 53 at the upper end of the screw 41, the lower surfaces of the housings 43 engage a facing 54 on the framework 15 to return the housings into position within the bracket 19, such movement compressing the springs 42 between the lower surface of the block 18 and the housings 43.

Pivotally mounted at 56 on the framework 15 adjacent each pair of catches 52 is an arm 57 having tappet members 58 extending into recesses 59 formed in the catches 52. The arms 57 are connected together by a link 61 which includes a connecting plate 62 itself connected to the core of a solenoid 63 secured to a fixed supporting bracket 64, a spring 66 normally holding the core in the inoperative position of the solenoid 63.

When breakage or exhaustion of the web 34 is detected by the detector arm 37 (FIG. 5), the control switch 38 is operated which, in turn, activated the solenoid 63 to cause the core to pull the plate 62, against the action of the spring 66, towards the solenoid 63. This movement, in turn, moves the link 61 which pivots the arms 57 to move the tappet members 58 into engagement with the latches 48 and move them clear of the catches 52 thus releasing the locking action on the upper roller assemblies. With the locking action thus released the springs 42 cause the brackets 19 to slide up the housings 43 until they engage the flanges on the housings, such movement pivoting the upper roller assemblies on the shafts 46 to move the rollers into inoperative position as shown in FIG. 4.

When the fault in the web feeding mechanism has been rectified the switch controlling the solenoid 63 is released and the arms 57 are returned to their inoperative position by the spring 66, it being a simple matter then for an operator to pivot the upper roller assemblies into operative position by manual pressure on the knobs 53, whereupon the assemblies are locked in that position by automatic engagement of the latches 48 and catches 52, such action, as mentioned above, placing the springs 42 again under tension.

It will be seen from the foregoing description that when a fault in the web feeding mechanism of the wrapping machine occurs, feeding of the rope 11 is arrested substantially instantaneously, by lifting the upper feed rollers 16 clear of the rope. At the same time the drive mechanism of the machine is stopped and the machine overrun completes the wrapping of partially wrapped sweets.

In the further embodiment of the invention illustrated in FIG. 6, the upper and lower feed rollers 16 and 13, respectively, are constructed, supported and driven in the same manner as that shown in FIG. 1, while the Geneva mechanism, constituting the common driving mechanism for the rollers, is itself driven by a shaft 67 connected by gearing 68 to a clutch and brake unit 69 itself driven by a motor 70. In this embodiment, the control switch 38 (FIG. 5) is connected directly to the clutch and brake unit 69, which is of a known type, so as to disengage the clutch and apply the brake upon actuation of the switch by the pivoting of the detector arm 37.

It will be seen, therefore, that when a fault in the web feeding mechanism of the wrapping machine is detected by the detector arm 37 in this embodiment of the invention, feeding of the rope 11 is arrested substantially instantaneously by actuation of the switch 38 which actuates the clutch and brake unit 69 to arrest the drive to the Geneva mechanism controlling the operation of the feed rollers 13 and 16.

What we claim is:

1. In a sweet-forming and wrapping machine comprising a wrapping mechanism, feed rollers for feeding a rope of candy or like confectionery towards the wrapping mechanism, cutting mechanism for severing sweets in succession from the leading end of the rope, means for transferring the sweets in succession to the wrapping mechanism, means for feeding wrappers in succession into the path of transfer of the sweets so that each sweet enters the wrapping mechanism with a wrapper partially folded about it, drum means for driving said machine, a single detector for sensing the feed of the wrappers and a switch immediately responsive to a detection by said detector of a failure in the wrapper feed to stop the machine drive, the improvement which consists in the provision, in a machine capable of running at such a high speed that the wrapping mechanism overruns an amount sufficient to complete the wrapping of partially wrapped sweets following the stopping of said machine drive by said stopping switch, of a device also controlled by said detector for rendering said feed rollers immediately ineffective thus to prevent overrun of rope feed in response to detection of a failure in the wrapper feed notwithstanding the overrun of said wrapping mechanism following stopping of said machine drive.

2. A machine according to claim 6, in which said feed rollers comprise at least one pair of upper and lower feed rollers connected by intermeshing gearing, and said device is operative to shift one roller of each pair of feed rollers from an operative position in driving contact with the rope to an inoperative position out of contact with the rope.

3. A machine according to claim 2, wherein each pair of feed rollers includes a bearing assembly which supports the upper roller and is mounted for pivotal movement about an axis spaced from the axis of rotation of the roller, a spring biasing the bearing assembly for pivotal movement to bring the upper roller into its inoperative position and a catch which normally locks the bearing assembly in a position in which the upper feed roller is operative, and preventing means operative to release the catch and thereby enable the spring to move the upper feed roller to its inoperative position.

4. A machine according to claim 1, in which said feed rollers comprise at least one pair of upper and lower feed rollers which are connected by intermeshing gearing and are driven from a motor through a clutch and brake unit and in which said device is operative to disengage the clutch and apply the brake of said unit.

5. A machine according to claim 1, wherein said machine operates at high speed to produce in the order of 1000 or more sweets per minute.

* * * * *

UNITED STATES PATENT AND TRADEMARK OFFICE
CERTIFICATE OF CORRECTION

PATENT NO. : 4,300,329

DATED : November 17, 1981

INVENTOR(S) : ARTHUR V. NAYLOR ET AL.

It is certified that error appears in the above-identified patent and that said Letters Patent are hereby corrected as shown below:

Column 4, Claim 1, line 10, "drum" should be --drive--;
Claim 2, line 1, "6" should be --1--.

Signed and Sealed this

Twenty-sixth Day of January 1982

[SEAL]

Attest:

GERALD J. MOSSINGHOFF

Attesting Officer

Commissioner of Patents and Trademarks